United States Patent [19]

Cinquemani

[11] 4,239,782
[45] Dec. 16, 1980

[54] FISH FOOD COMPOSITION AND A PROCESS FOR ENHANCING THE COLOR OF FISH

[75] Inventor: Robert Cinquemani, New Hyde Park, N.Y.

[73] Assignee: Aquatic Diet Technology Inc., Farmingdale, L. I., N.Y.

[21] Appl. No.: 29,916

[22] Filed: Apr. 16, 1979

[51] Int. Cl.$^3$ .................................................. C12K 1/00
[52] U.S. Cl. .......................................... 426/2; 426/74; 426/250; 426/268; 426/270; 426/623; 426/630; 426/635; 426/805; 119/3
[58] Field of Search .................... 426/270, 2, 1, 73, 74, 426/643, 657, 805, 635, 623, 630, 641, 646, 250, 268; 424/238, 240; 119/3

[56] References Cited

U.S. PATENT DOCUMENTS

| 3,591,389 | 7/1971 | Schneider | 426/805 X |
| 3,906,112 | 9/1975 | Anderson | 426/250 X |
| 3,997,679 | 12/1976 | Salkin | 426/250 |

FOREIGN PATENT DOCUMENTS 2003711  3/1979  United Kingdom ........................ 119/3

OTHER PUBLICATIONS

Stecher "The Merck Index" Published by Merck & Co. Inc. 1968 pp. 1020–1021.

*Primary Examiner*—R. B. Penland
*Attorney, Agent, or Firm*—Anthony J. Casella; Michael A. Stallman

[57] ABSTRACT

A fish food composition and a process for using the composition are provided for enhancing the color of fish. The fish food composition is a combination of conventional fish food with pigmenting agents and limited amounts of the hormone testosterone. The process includes raising newborn fish on conventional fish food for five to eight weeks, and then continuously feeding the subject composition to fish for eight weeks to obtain peak coloration. The feeding of the new composition is continued for as long as color enhancement is desired.

5 Claims, No Drawings

FISH FOOD COMPOSITION AND A PROCESS FOR ENHANCING THE COLOR OF FISH

The subject invention relates to a new and improved fish food composition and a method of using this composition to enhance the color of fish. More particularly, the fish food composition is a combination of conventional fish food with pigmenting agents and the hormone testosterone. The method for enhancing the color of fish involves feeding the fish, which are older than approximately five weeks, this new composition for a period of approximately eight weeks to bring out peak coloration in the fish.

It is well known that the fish and especially tropical fish when taken from their natural environment and placed in captivity will lose much of their brilliant coloring. When these tropical fish are kept as pets, it would be beneficial to restore this coloring to permit full enjoyment while viewing the fish. Conventional fish food diets which supply the basic nutrients and vitamins to keep the fish healthy fail to restore their original brilliant colors. Further, the addition to standard fish foods of pigmenting agents alone will bring out only minimal changes in coloring.

Accordingly, it is an object of the subject invention to provide a new and improved fish food composition which will enhance the coloration of fish.

It is a further object of the subject invention to provide a method of feeding fish with the new composition to enhance their color.

In accordance with these and many other objects, the subject invention provides for an improved fish food composition which includes pigmenting agents in combination with the hormone testosterone. More specifically, the subject invention involves the addition of a pigmenting agent and testosterone to a conventional fish food composition. The conventional fish food should consist of a feed normally used for the type of fish to be nourished. An example of a conventional fish food would include shrimp meal, fish meal, soy protein, yeast, vegetable oils, and vitamins. Added to the conventional fish food composition are pigmenting agents in amounts generally ranging from 0.5% to 1% by weight of the total composition. Preferable pigmenting agents include carotenoids such as Canthaxantin, Paprika, astaxanthin and B-carotene for enhancing the red coloring of the fish. For enhancing the yellow coloring of the fish, the following pigmenting agents may be used: lutein; apo-carotonal; and marigold. The specific pigmenting agent used is dependent on which color is sought to be brought out or enhanced in the fish, and pigmenting agents may be used independently or in combinations of pigmenting agents. The particular colors that are enhanced by each of these pigmenting agents in species other than fish is well known in the art. However, their effects on fish have heretofore been minimal. It should also be noted that the hormone methyl testosterone has also been used in connection with young, immature fish for the purpose of altering the sex of the fish in order to effectively alter the sex ratios in a larger group of fish.

In the subject invention, it has been found that the addition of limited amounts of the hormone testosterone act as a catalyst in combination with a chosen pigmenting agent or agents to enhance the color of fish. Specifically, a limited amount of testosterone, ranging for example, in amounts from only 0.003% to 0.018% by weight of the total composition, is enough to cause marked enhancement of the coloration of fish.

The fish food of the subject invention is made by first dissolving the testosterone in ethanol. A dispersing agent such as Tween 80 (which is a polysorbate, a surface-active chemical) is added to assure uniformity throughout the solution. This solution is then combined with the chosen pigmenting agent or agents and water, whereupon the entire composition is blended to a uniform homogeneous mix. This composition is then combined with a conventional fish food and formed into pellets, chips or flakes as desired.

To form pellets, the paste is extruded through a suitable die to form an elongated cylindrical rod which is cut to short lengths to form cylindrical pellets. To form chips, the pellets may be passed through a drum dryer. Flakes may be formed by forming a slurry of the solution and then passing the slurry through a drum dryer. It has been found that fish which are larger than two inches in length more readily consume chips.

Through experimentation, it has been found that feeding fish a steady diet of the new and improved fish food of the subject invention will result in a noticeable enhancement of color in as little as three days with peak color enhancement occurring generally eight weeks from the start of feeding. More specifically, the method for enhancing the color of the fish includes raising fish on a standard diet during their first five to eight weeks of life. After this time, the fish may be fed a diet consisting of the new fish food composition which will result in the enhancement of their coloring. Should a diet of conventional fish food be resumed, a marked loss of coloration will occur. Thus, to keep the coloration of the fish at high levels a continuous diet of the new fish food composition should be maintained.

It has been found that by increasing the level of testosterone within the prescribed limits, the speed at which peak coloration is reached is increased. While as little as 0.003% testosterone will cause color enhancement, a level of 0.009% will generally cause peak color enhancement to occur after eight weeks of continuous feedings. The hormone testosterone may be from the broad group of androgens and, more specifically, 17α methyl testosterone or 17α ethyl testosterone.

The specific conventional fish food used could consist of the following ingredients and percentages by weight:

| Ingredient | Percentage |
| --- | --- |
| Shrimp Meal | 15% |
| Fish Meal | 14% |
| Fish Protein Concentrate | 13% |
| Soy Protein | 15% |
| Yeast Protein | 14% |
| Rice Starch | 10% |
| Dried Whey | 2% |
| Fish Oil | 4% |
| Soy Oil | 2% |
| Fish Solubles | 5% |
| Lecithin | 2% |
| Vitamin Premix | 2% |
| Binding Ingredients | 2% |
| Total | 100% |

The selection of the pigmenting agent or agents is governed by the particular color or colors sought to be enhanced. For example, Canthaxantin is highly effective in bringing out the red color. It has been found that marigold is effective in bringing out the yellow colors.

An example of treating the fish by the subject method and the results obtained therefrom are illustrated in the table below. In this test, the diets consisted of a conventional fish food of the type set forth above, along with the following listed additives as measured as percentages of weight of the resulting composition:

Diet #1—0.5% Canthaxantin+0.003% testosterone.
Diet #2—0.5% Canthaxantin+0.006% testosterone.
Diet #3—0.5% Canthaxantin+1% marigold+0.018% testosterone.
Diet #4—0.5% Canthaxantin+1% marigold+0.006% testosterone.

Mature fish, which were five to eight weeks old, were treated with these diets. The elapsed time is measured in days from initial feeding of the diets.

| DIET # | 1 | 2 | 3 | 4 |
| --- | --- | --- | --- | --- |
| INCEPTION OF COLOR - (Days elapsed) | 10 | 7 | 14 | 5 |
| PEAK COLOR REACHED - (Days elapsed) | 45 | 28 | 59 | 21 |

The qualitative results of this test illustrated that where fish were fed diets 1 and 2, the red, blue and green colors were brought out equally well, while the fish on diets 3 and 4 had, in addition, their yellow colors enhanced. It should be noted that by increasing or decreasing the pigmenting agents or the levels of testosterone, different levels of color can be achieved and the time periods for accomplishing these levels of color can be controlled. In addition, it has been found when using tropical fish, water temperatures should be maintained at approximately 78° F.

Accordingly, there is provided a new and improved fish food composition and a method for enhancing the color of fish. A pigmenting agent and the hormone testosterone are added to a conventional fish food which is then fed to fish which are five to eight weeks of age to enhance their natural colors.

Although the subject invention has been described by reference to specific embodiments, it will be apparent that many other modifications could be devised by those skilled in the art that would fall within the spirit and scope of the present invention and as defined by the appended claims.

What is claimed is:

1. A method of enhancing the color of new born fish comprising the steps of:
   feeding the fish an edible proteinaceous fish food composition until they are five to eight weeks old;
   thereafter feeding said fish a combination of an edible fish food composition comprising proteins, carbohydrates and fats and further including testosterone in an amount ranging from 0.003% to 0.018% by weight of the total combination and an organic pigmenting agent in an amount ranging from 0.5% to 1% by weight of the total combination, and wherein said organic pigmenting agent is selected from the group consisting of carotenoids, Canthaxantin, lutein, apo-carotonal, and marigold; and
   continuing said feeding step for as long as color enhancement is desired.

2. A method of enhancing the color of new born fish as recited in claim 1 wherein said pigmenting agent is Canthaxantin.

3. A method of enhancing the color of new born fish as recited in claim 1 wherein said pigmenting agent is a carotenoid selected from the group consisting of paprika, astaxanthin and B-carotene.

4. A method of enhancing the color of new born fish as recited in claim 1 wherein said testosterone is 17α methyl testosterone.

5. A method of enhancing the color of new born fish as recited in claim 1 wherein said testosterone is 17α ethyl testosterone.

* * * * *